(12) United States Patent
Elahi

(10) Patent No.: US 11,369,913 B2
(45) Date of Patent: Jun. 28, 2022

(54) AIR POLLUTION REMEDIATION SYSTEM FOR LARGE OPEN-AIR SPACES

(71) Applicant: Nasik Elahi, New City, NY (US)

(72) Inventor: Nasik Elahi, New City, NY (US)

(*) Notice: Subject to any disclaimer, the term of this patent is extended or adjusted under 35 U.S.C. 154(b) by 238 days.

(21) Appl. No.: 15/929,400

(22) Filed: Apr. 30, 2020

(65) Prior Publication Data

US 2020/0346161 A1 Nov. 5, 2020

Related U.S. Application Data

(60) Provisional application No. 62/840,512, filed on Apr. 30, 2019.

(51) Int. Cl.
*B01D 53/04* (2006.01)
*B01D 46/00* (2022.01)

(52) U.S. Cl.
CPC ..... *B01D 53/0431* (2013.01); *B01D 46/0036* (2013.01); *B01D 53/0446* (2013.01); *B01D 2253/102* (2013.01); *B01D 2259/4525* (2013.01)

(58) Field of Classification Search
CPC .............. B01D 53/04; B01D 53/0415; B01D 53/0431; B01D 53/0446; B01D 46/0036; B01D 2253/102; B01D 2257/106; B01D 2257/302; B01D 2257/404; B01D 2257/502; B01D 2257/702; B01D 2257/708; B01D 2258/06; B01D 2259/4525
USPC ...... 96/108, 134, 139, 140, 142, 152; 95/90; 422/120, 122
See application file for complete search history.

(56) References Cited

U.S. PATENT DOCUMENTS

| | | | |
|---|---|---|---|
| 3,721,072 A | 3/1973 | Clapham | |
| 4,292,052 A * | 9/1981 | Cardullo | B01D 46/12 55/314 |
| 4,385,911 A * | 5/1983 | Popeil | B01D 46/10 55/323 |
| 4,559,066 A * | 12/1985 | Hunter | B01D 46/0004 96/117.5 |
| 4,695,561 A | 9/1987 | Deitz | |
| 4,722,747 A * | 2/1988 | Armbruster | B60H 3/0608 96/140 |
| 4,909,815 A | 3/1990 | Meyer | |
| 4,996,030 A | 2/1991 | Kitahara et al. | |

(Continued)

*Primary Examiner* — Frank M Lawrence, Jr.
(74) *Attorney, Agent, or Firm* — Dunlap Bennett & Ludwig, PLLC

(57) ABSTRACT

An air pollution remediation system is provided. The systemic apparatus includes a tubular column having a plurality of spaced apart vents along its outer surface. Each vent has adjustable louvers for controlling the airflow therethrough. An airflow conduit extends along the longitudinal length of the column with porous layers and a mass of absorbent disposed between the airflow conduit and the plurality of vents. A fan fluidly coupled to the airflow conduit urges ambient air into the airflow conduit and through the porous layers and the mass of absorbent and out of the vents in a selectively controlled manner by way of the adjustable louvers. A prefilter may be disposed upstream of the fan. A network of the systemic apparatus can be arranged to provide, in a selective enabled manner through the adjustable louvers, a contiguous looping canopy of purified air over large open spaces.

7 Claims, 3 Drawing Sheets

(56) References Cited

U.S. PATENT DOCUMENTS

| | | | |
|---|---|---|---|
| 5,288,306 A * | 2/1994 | Aibe | B01J 20/28045 |
| | | | 95/141 |
| 5,397,382 A * | 3/1995 | Anderson | A01G 9/02 |
| | | | 96/135 |
| 6,006,471 A | 12/1999 | Sun | |
| 6,063,170 A | 5/2000 | Deibert | |
| 6,103,205 A | 8/2000 | Wojtowicz et al. | |
| 6,352,578 B1 | 3/2002 | Sakata et al. | |
| 6,413,303 B2 | 7/2002 | Gelderland et al. | |
| 6,464,760 B1 | 10/2002 | Sham et al. | |
| 6,481,232 B2 | 11/2002 | Faqih | |
| 6,607,573 B1 | 8/2003 | Chaurushia et al. | |
| 6,773,491 B1 | 8/2004 | Bohl | |
| 8,609,191 B2 | 12/2013 | Raetz et al. | |
| 9,327,224 B2 | 5/2016 | Ajemian | |
| 9,486,549 B2 | 11/2016 | Sugimoto et al. | |
| 9,611,819 B2 | 4/2017 | Yi | |
| 9,651,497 B2 | 5/2017 | Minkara et al. | |
| 2004/0003724 A1 * | 1/2004 | Ellis | A01M 1/2077 |
| | | | 96/115 |
| 2004/0020363 A1 * | 2/2004 | LaFerriere | B01D 46/12 |
| | | | 95/273 |
| 2007/0157585 A1 | 7/2007 | Lee | |
| 2008/0092745 A1 * | 4/2008 | Tsao | B01D 46/0038 |
| | | | 96/224 |
| 2009/0014005 A1 | 1/2009 | MacKinnon | |
| 2011/0162273 A1 | 7/2011 | Mittelmark et al. | |
| 2013/0142692 A1 | 6/2013 | Tarifi | |
| 2014/0137743 A1 | 5/2014 | Reeh | |

\* cited by examiner

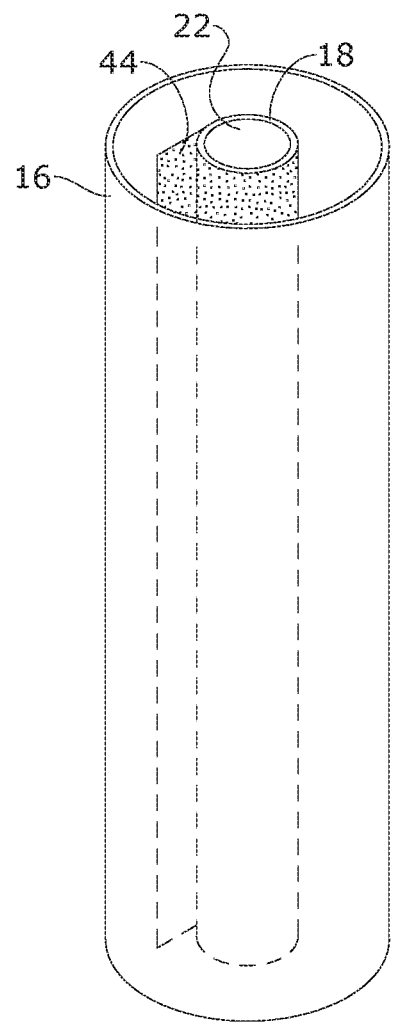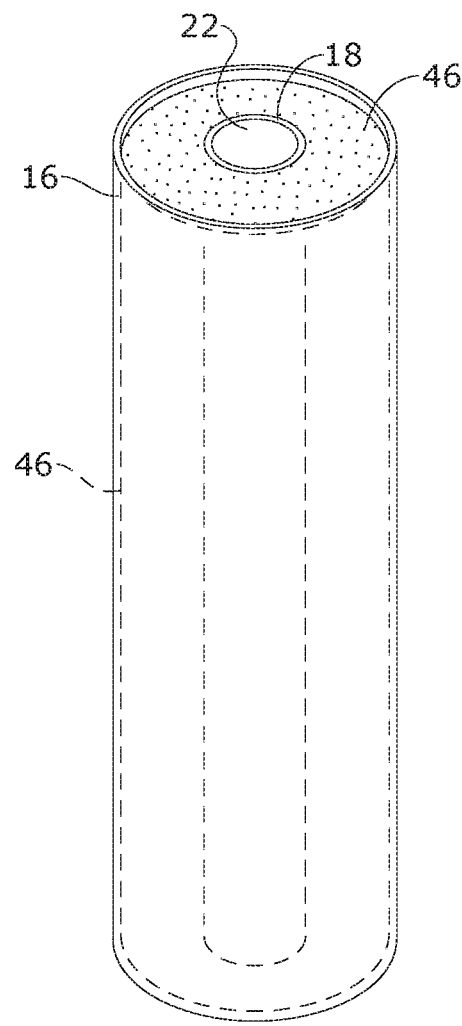

AIR POLLUTION REMEDIATION SYSTEM FOR LARGE OPEN-AIR SPACES

CROSS-REFERENCE TO RELATED APPLICATION

This application claims the benefit of priority of U.S. provisional application No. 62/840,512, filed 30 Apr. 2019, the contents of which are herein incorporated by reference.

BACKGROUND OF THE INVENTION

The present invention relates to remediating air pollution and, more particularly, to an air pollution remediation system for large open-air spaces.

Air pollution control and remediation has garnered intense attention over the years resulting in hundreds of patents. Such divergent efforts are systematically catalogued by a number of private and governmental organizations. The National Center for Science and Engineering Statistics (NCES) division of the National Science Foundation (NSF) has created a comprehensive list of patents identifying clean energy and pollution control.

The Air Pollution Control Technologies Compendium provides an international overview of air pollution remediation efforts. The OECD (organization for Economic Cooperation and Development) provide an up to date compendium of patents for air pollution abatement in its statistical report for 2018.

Air pollution, both outdoors and indoors, characterized by various pollutants at extremely low levels, is recognized as a primary public health hazard. The US EPA has a priority list of air pollutants, also known as "criteria air pollutants" that impact public health: #1. Fine particulate matter; #2. Ozone; #3. Sulfur dioxide; #4. Nitrogen Oxides; #5. Carbon monoxide; and #6. Volatile Organics (VOCs). Particle pollution and ground level ozone pollution can cause asthma and all the named pollutants adversely impact the cardiovascular and respiratory system resulting in increased hospitalization, emergency room visits and higher mortality rates.

The present-day technologies for capturing pollutants from gas streams utilize adsorbents in either fixed or continuous beds, primarily directed for industrial purposes where concentrated pollutants are captured from industrial effluents at their points of origin to reduce the levels of emissions into the atmosphere. Such regulated remedies have reduced the release of pollutants to meet the national air quality standards set by agencies such as US EPA (Environmental Protection Agency). However, rapid deforestation, industrialization, increased automotive use and congestion from overpopulation around the globe has added to the pollution loads of the atmosphere and urban smog to record levels. Such increases from human activity in greenhouse gases are creating global climate changes that are feared by most scientists to be fast approaching the point of no return.

The state-of-the-art techniques for air pollution removal are designed for either industrial or consumer products for home use, and works well for industrial effluents and cleanup of confined spaces such as greenhouses or rooms but do not provide effective mitigation of pollutant levels released into the general atmosphere to create smog. And successful remediation of air pollution must wait for natural effects like rain to wash down or air streams that carry away the pollutants over much larger areas.

As can be seen, there is a need for a remedy that can reduce the levels of open-air pollutants near their points of concentration and clean up designated areas for human use before they dissipate beyond.

SUMMARY OF THE INVENTION

In one aspect of the present invention, an air pollution remediation apparatus includes the following: a tubular column having a plurality of vents; adjustable louvers associated with each vent; an airflow conduit within the tubular column; a mass of absorbent and a mass of absorbent disposed between the airflow conduit and the plurality of vents; and an airflow urging device fluidly coupled between the airflow conduit and open air. In certain embodiments, the air pollution remediation apparatus further includes the following: an inner porous layer and an outer porous layer sandwiching the mass of adsorbent and absorbent, wherein each adjustable louvers controls a direction, a speed and a flow of an airflow therethrough; a prefilter disposed upstream of the airflow urging device; and an inner filter surface disposed between the airflow urging device. In another aspect of the present invention, the air pollution remediation system includes the following: a plurality of the above-mentioned air pollution remediation apparatuses positioned at an elevation above a space; and each adjustable louvers selectively controlled to enable a contiguous looping canopy of purified air over the space.

In yet another aspect of the present invention, method of enabling a synthetic reforestation plan includes providing the above-mentioned air pollution remediation system over an urban environment.

These and other features, aspects and advantages of the present invention will become better understood with reference to the following drawings, description and claims.

BRIEF DESCRIPTION OF THE DRAWINGS

FIG. 5 is a schematic view of an exemplary embodiment of the present invention; and FIG. 6 is a schematic view of an exemplary embodiment of the present invention.

DETAILED DESCRIPTION OF THE INVENTION

Figure 1:
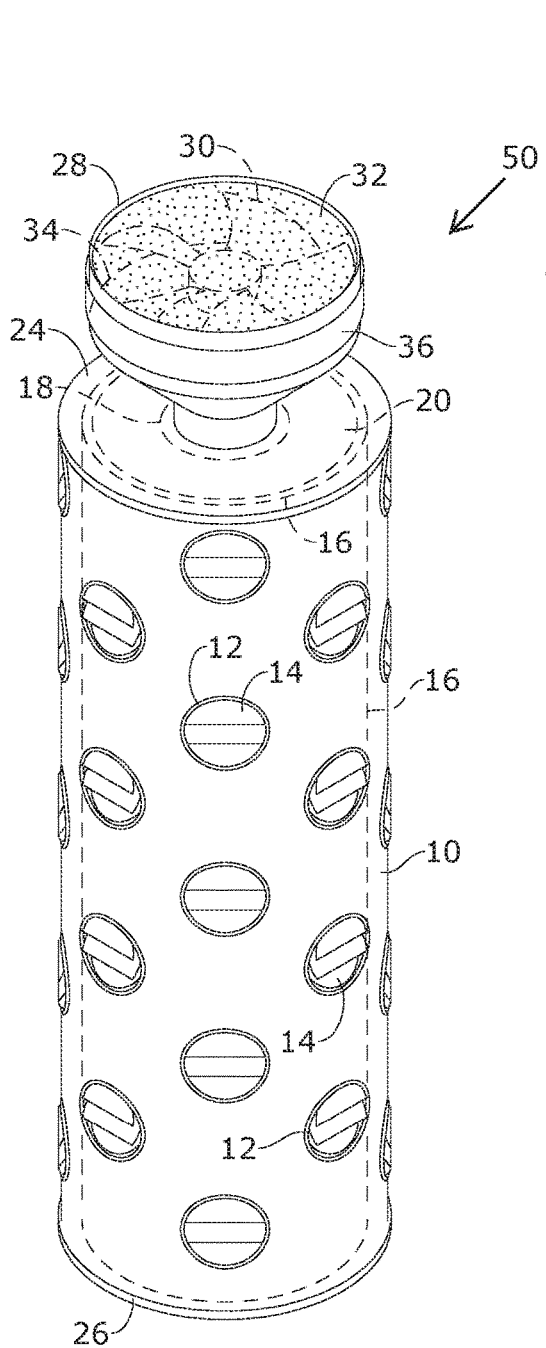
FIG. 1 is a schematic view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an air pollution remediation system. The systemic apparatus includes a tubular column having a plurality of spaced apart vents along its outer surface. Each vent may have adjustable louvers for controlling the airflow through the vents. An airflow conduit is centered along the longitudinal length of the column with one or more porous layers and a mass of absorbent disposed between the airflow conduit and the plurality of vents. A fan fluidly coupled to the airflow conduit urges ambient air into the conduit and through the one or more porous layers and the mass of absorbent and out of the vents in a selectively controlled manner by way of the adjustable louvers. A prefilter may be disposed upstream of the fan. A network of the systemic apparatus can be arranged to provide, selectively enabled through the adjustable louvers of each apparatus, a contiguous looping canopy of purified air over large open spaces.

The present invention includes a public air pollution remediation system (PARS) for open air spaces. The basic apparatus is a long cylindrical column unit, plastic or metal, fitted with rows of vent holes with adjustable louvered shutters running along its length and breadth; the bottom end is sealed by a removable cover plate while the top end has a tapered opening that allows a fan motor and prefilter to be fitted in.

The unit can be shaped as a unique housing to seamlessly fit any existing design of porous cylindrical columns or cartridges packed with adsorbents such as activated charcoal particle beds or sheets around a hollow inner porous chamber that runs the length of the assembly. The use of vents with adjustable openings and shutters to either shut off or control the direction, speed and flow of the purified air is a feature of the device. An electric motor may pump the polluted air through the column whereby the pollutants are captured by the adsorbent bed; the purified air exits through the vent holes in the desired directions under positive pressure. The PARS unit can be fitted with sensors and a prefilter to monitor and enhance the functions under different weather conditions.

An embodiment is to attach the columns on all existing lamp posts along congested streets or highways to continually cleanse large volumes of air and release them in the desired arcs through the adjustable vent holes. Each unit can be fitted with prefilters and sensors to monitor and control usage under different climatic conditions. The network of cleansing columns can be viewed as synthetic urban reforestation. Each column is like a tree that inhales polluted air and exhales purified airflows that are easily adjusted and directed through the adjustable vents, under positive pressure, to spread and provide a contiguous looping canopy of purified air over large open spaces. The basic design can be modified for a variety of applications along highways, tunnels and bridges, stadiums, school yards, playgrounds, rooftop gardens, playgrounds, school yards and the like to reduce air pollution levels of large open-air spaces. The units can also be deployed around industrial locations such as gasoline or oil storage tanks, animal stockyards, truck stops and electric power stations to capture escaping hydrocarbons and other pollutants.

Referring now to FIG. 1, the present invention includes a public air pollution remediation system (PARS) for open air spaces. The basic PARS apparatus 50 may include a collector columnar housing 10 providing a plurality of vents 12 spaced apart over the entire surface of the columnar housing 10. Each vent 12 may have adjustable louvers 14, whose size, shape and placement vary with the intended use.

Figure 2:
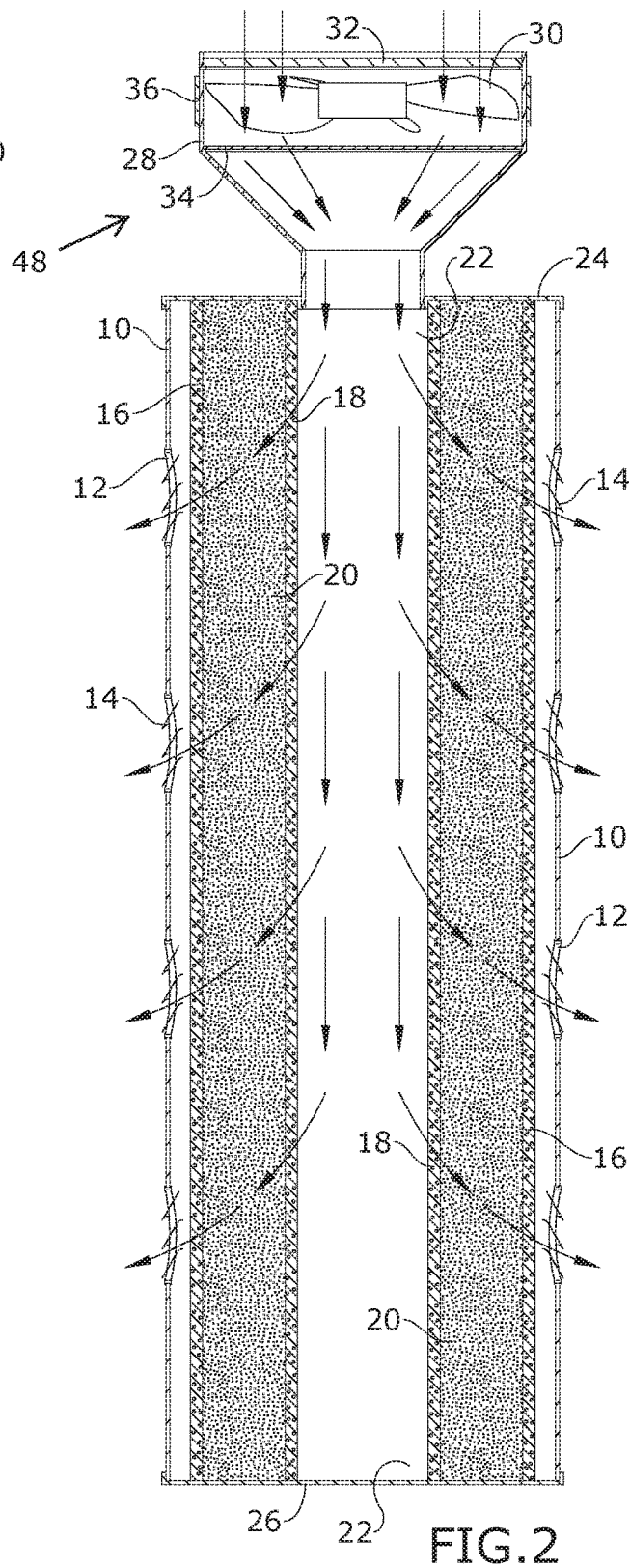
FIG. 2 is a section view of an exemplary embodiment of the present invention.

Referring to FIG. 2, the PARS columnar housing 10 can be made to accommodate any of the available designs of columns packed with adsorbents such as activated charcoal as particle beds or sheeting 44 that is wound around a hollow inner porous surface 18. In certain embodiments, there may be a mass of adsorbents 20, such as fabric air filter 46, sandwiched between an outer porous column 16 and the inner porous column 18, wherein the inner porous column 18 defines an airflow conduit 22. A top portion of the columnar housing 10 may be closed off with a top cap 24 (except for the airflow conduit 22), while a bottom portion of the columnar housing 10 is closed off with a bottom cap 26.

The use of vents 12 with adjustable openings, flaps, louvers 14 to control the direction, speed and flow of the purified air lends itself to the advantages of the present invention. A fan 30 urges the polluted ambient air through the air conduit 22 whereby the particulates are trapped by the inner filter layer and the pollutants are captured by the adsorbent bed 20; the purified air stream exits through the vent holes 12 in the desired directions, speed and spread.

Figure 3:
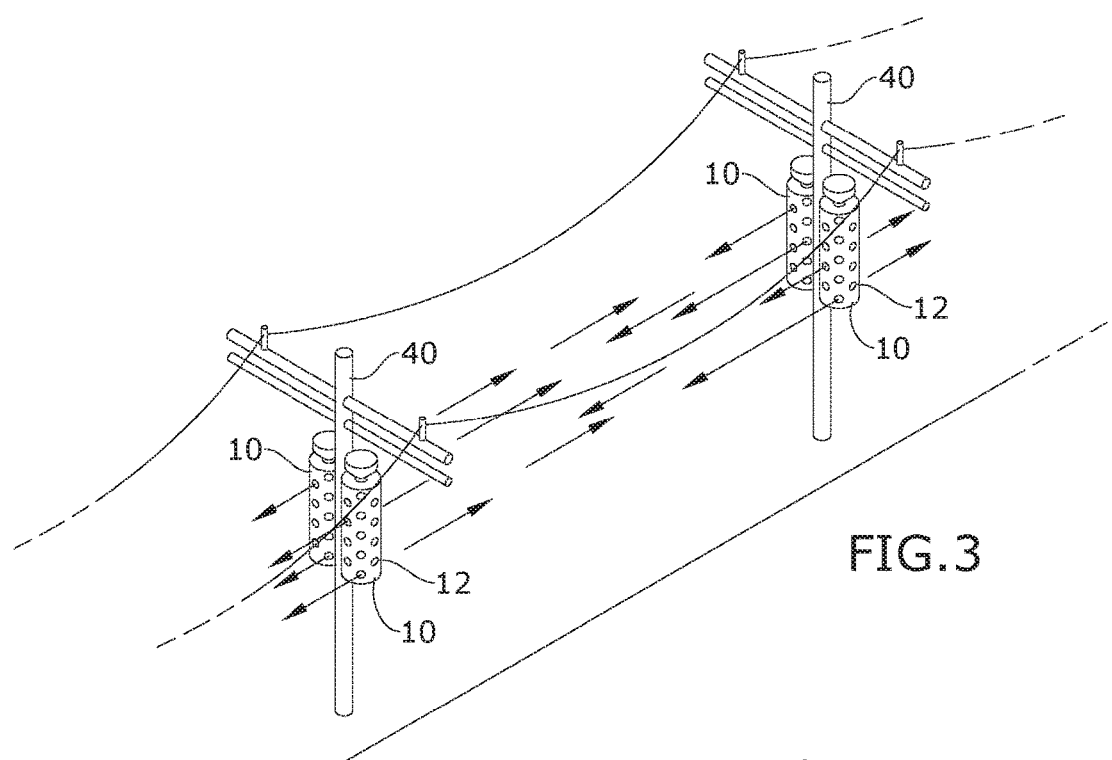
FIG. 3 is a schematic view of an exemplary embodiment of the present invention, illustrating installation of the present invention.
Figure 4:
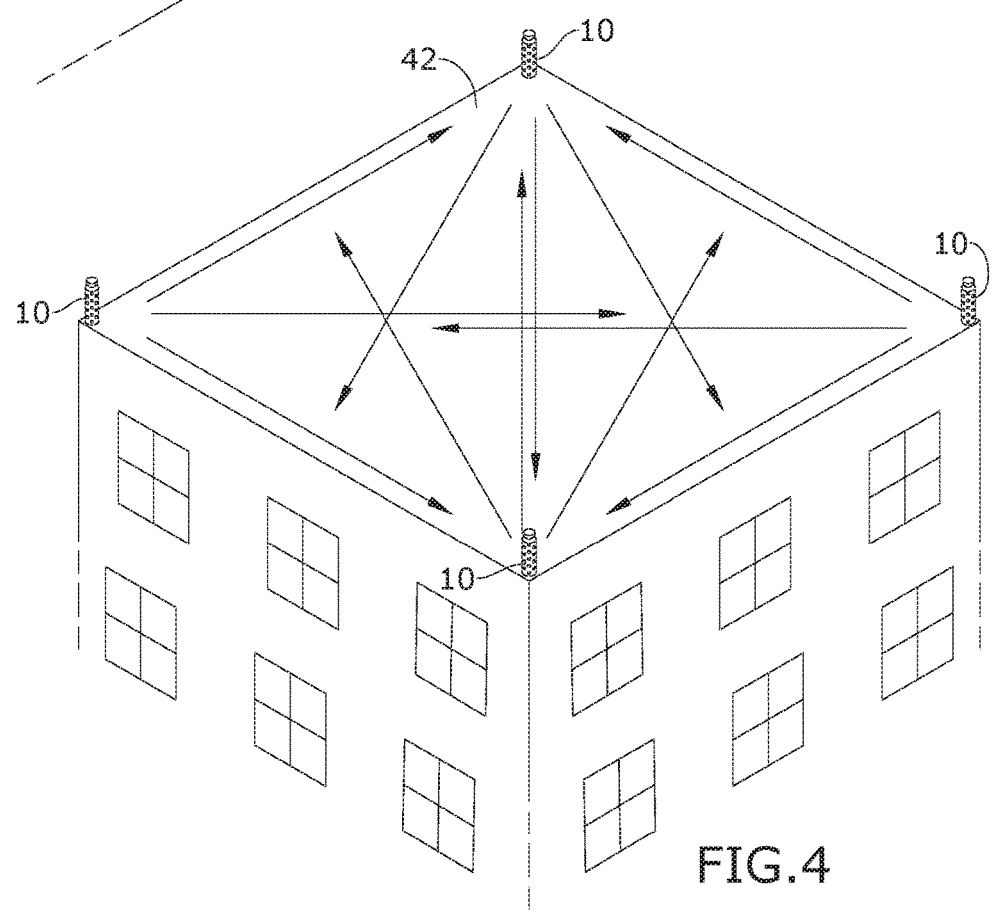
FIG. 4 is a schematic view of an exemplary embodiment of the present invention, illustrating installation of the present invention.

Referring to FIGS. 3 and 4, an embodiment is to attach the PARS apparatus 50 on all existing lamp posts 40 (FIG. 3) along congested streets or highways to continually cleanse large volumes of air and release them in the desired arcs through the adjustable vent holes 12. The network of cleansing PARS apparatus 50 creates a unique farm system whereby the airflow exiting from each PARS apparatus 50 is easily adjusted and directed to spread and provide a contiguous looping canopy of purified air over large open spaces. The present invention can be viewed as a synthetic urban reforestation plan. The basic design can be modified for a variety of applications along highways, tunnels and bridges, stadiums, playgrounds, rooftop (FIG. 4), school yards and the like to reduce air pollution levels of large open-air spaces. The units can also be deployed around industrial locations such as gasoline or oil storage tanks, animal stockyards, truck stops and electric power stations to capture escaping hydrocarbons and other pollutants.

The network of cleansing PARS apparatus 50 creates a unique farm or forest system that cleanses the atmosphere of pollutants and then the purified air outflow from each PARS apparatus 50 is easily adjusted and coordinated with the surrounding PARS apparatuses 50 to provide a contiguous looping canopy of purified air over designated areas of open spaces. To prevent entraining adsorbent particles or buildup of fluids while pumping large volumes of air the preferred mode is to direct the air downwards.

In areas with high particulate contamination the PARS apparatus 50 can be fitted with a prefilter assembly 48. Along an upper portion of the prefilter assembly 48 is an intake for receiving atmosphere. Along the intake is a prefilter 32 that the atmosphere passes through by way of the urging of the fan 30 and associated fan housing 28 disposed between the prefilter 32 and the airflow conduit 22. The prefilter 32 is adapted to entraps larger particles that roll down the sides before entering the cleansing PARS apparatus 50. Downward of the fan 30 is an inner filter surface 34 adapted to entrap finer particles around the void chamber. To prevent clogging of the filters, the particles can be shaken loose using a vibratory collar 36 that can be attached to the housing of the prefilter assembly 48. Depending from the inner filter surface 34 is a funnel-shaped, conical portion that fluidly connects with the airflow conduit 22.

The housing column 10 has unique features. Each vent porthole 12 is provided with a set of adjustable louvers 14 openings that can be set to obtain the desired flow, direction, spread radius and trajectory of the purified air. The remediation system of the present invention includes a farm of the adsorbent columns 50 attached to light poles and other existing structures that work in tandem along highways, tunnels, bridges, school yards and any public gathering places. To further aid in pollution remediation, the outer housing unit with vent holes 12 can be fabricated from recycled plastic.

The filters of the adsorbent column bed can be constructed using any type of porous or sintered materials or filter fabrics. The use of charcoal has the ability to be thermally regenerated several times, the outer column 10 may be fabricated from heat resistant material for desorption without disassembly. The inner and outer porous columns 16 and 18 containing the charcoal can be retrieved and heated to desorb the pollutants for proper disposal. The reactivated charcoal can be utilized a number of times.

The charcoal for use in the system can be derived by charring any carbonaceous products such as coconut shells, garbage and even human and animal waste products and activating it thermally to create the desired pore structure. Additionally, the piping used for the housing column can be fabricated from recycled plastics.

The size of the column unit is determined by its intended use. The adsorption capacity of activated charcoal ranges from 0.3 to 0.7 kilograms of pollutants per kilogram of dry adsorbent. Units can be designed with the appropriate capacity and flow based on the levels of pollutants. The particle size of the charcoal, filter surface, flow rates and length of the column determine the positive pressure needed to optimize the desired outflow.

The units can also be fitted with additional features. The pump motor can be run using solar energy during sunlight hours and electricity in the off hours. Charcoal functions best at low humidity. The unit can be retrofitted with sensors for humidity control that shut off the motor during rain or high humidity. Sensors can also be attached to detect the breakthrough point at which the charcoal has reached its adsorption capacity and needs to be replaced.

It should be understood, that though the above discussion is centered on wide open spaces, the present invention can be easily downsized for consumer use; for instance, the positive pressure flows enable rapid purification of the air in an office or home.

It should be understood, of course, that the foregoing relates to exemplary embodiments of the invention and that modifications may be made without departing from the spirit and scope of the invention as set forth in the following claims.

What is claimed is:

1. An air pollution remediation apparatus, comprising:
    a tubular column having a plurality of vents;
    adjustable louvers associated with each vent;
    an airflow conduit within the tubular column;
    a mass of adsorbent disposed between the airflow conduit and the plurality of vents; and
    an airflow urging device fluidly coupled between the airflow conduit and open air.

2. The air pollution remediation apparatus of claim 1, further comprising:
    an inner porous layer and an outer porous layer sandwiching the mass of absorbent.

3. The air pollution remediation apparatus of claim 1, wherein each adjustable louvers controls a direction, a speed and a flow of an airflow therethrough.

4. The air pollution remediation apparatus of claim 3, further comprising:
    a prefilter disposed upstream of the airflow urging device.

5. The air pollution remediation apparatus of claim 4, further comprising:
    an inner filter surface disposed below the airflow urging device.

6. An air pollution remediation system, comprising:
    a plurality of air pollution remediation apparatuses of claim 1 positioned at an elevation above a space; and
    each adjustable louvers selectively controlled to enable a contiguous looping canopy of purified air over the space.

7. A method of enabling a synthetic reforestation plan, comprising:
    providing the air pollution remediation system of claim 6 over an urban environment.

\* \* \* \* \*